UNITED STATES PATENT OFFICE.

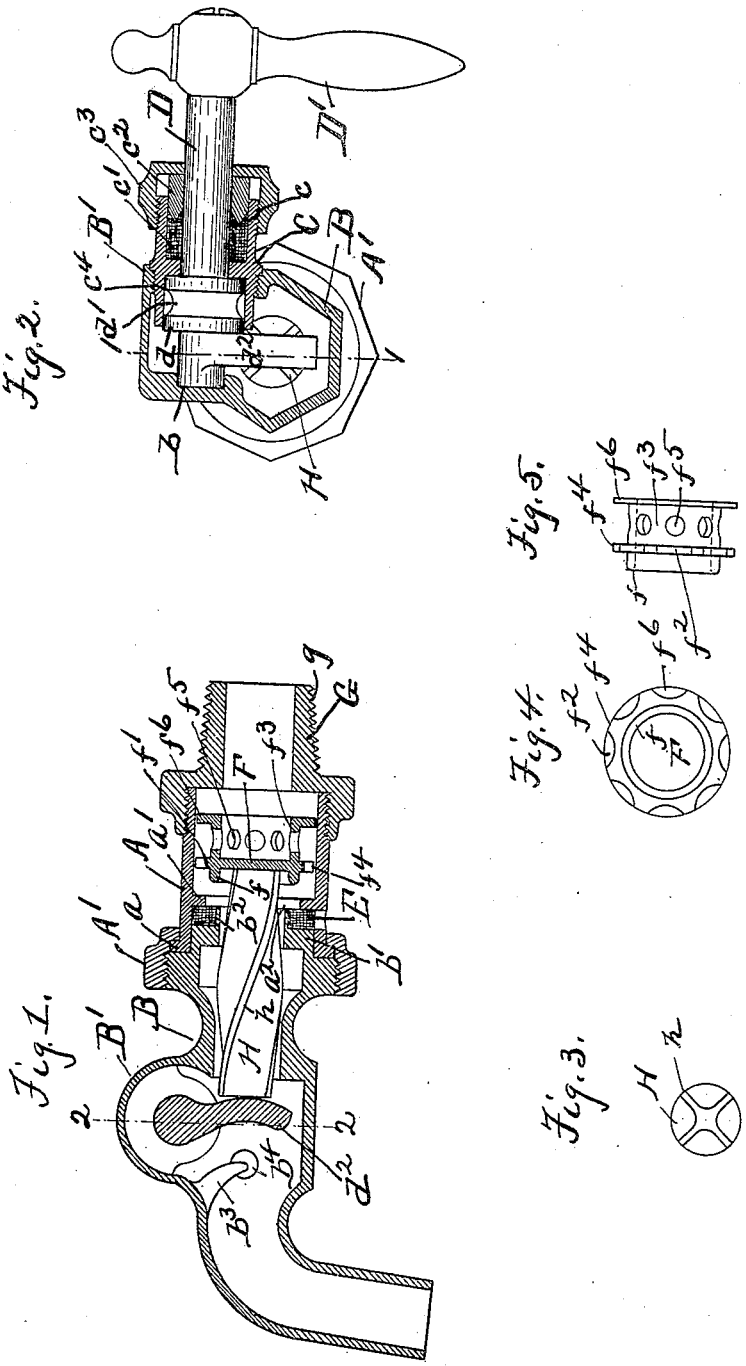

WILLIAM B. M. BASHLIN, OF ERIE, PENNSYLVANIA.

FAUCET.

954,607.  Specification of Letters Patent.  Patented Apr. 12, 1910.

Application filed April 17, 1906. Serial No. 312,139.

*To all whom it may concern:*

Be it known that I, WILLIAM B. M. BASHLIN, a citizen of the United States, residing at Erie, in the county of Erie and State of Pennsylvania, have invented new and useful Improvements in Faucets, of which the following is a specification.

This invention relates to faucets and consists in certain improvements in the construction thereof as will be hereinafter fully described and pointed out in the claims.

The invention is illustrated in the accompanying drawings as follows:—

Figure 1 shows a section on the line 1—1 in Fig. 2. Fig. 2, a section on the line 2—2 in Fig. 1. Fig. 3, an end view of the push pin. Fig. 4, an end view of the valve. Fig. 5, a side elevation of the same.

A marks the valve body and B a body extension removably secured to the valve body. Arranged on the side of the extension is a stem body B'. A cap C is screwed into the stem body. It has the socket $c$ in which is arranged the packing material $c'$. A follower $c^2$ is arranged on the packing and a flange nut $c^3$ is arranged on the follower in the usual manner. The stem D extends through the gland formed by the part just described. It is provided with the operating handle D'. The inner part of the cap C has a cylindrical socket $c^4$ in which is arranged a cylindrical shoulder $d$ with a sealing groove $d'$ therein. This construction largely obviates the necessity for a packing or a gland. The end of the stem enters a socket $b$ in the body extension B'. An arm $d^2$ extends from the stem to and beyond the axis of the valve body.

The valve body A is preferably provided with the shoulder $a$. This shoulder is engaged by the flange nut A' which extends over this shoulder and is screwed onto the end of the extension B. This construction is desirable where the faucet is used in a position that will not permit of the turning of the extension, as for instance where two of the extensions are coupled together. The extension is provided with a projecting shoulder $b'$ which extends into the end of the valve body A so as to give some rigidity to the connection after the nut A' is loosened. It also forms a closure which prevents the leakage of water after the nut is loosened and prior to the time the auxiliary seating devices are closed. The gasket E is arranged around the shoulder $b'$ and is clamped between the shoulder $b'$ and the valve shoulder $a'$ on the valve body. The opening through the gasket or packing E is smaller than the opening $a^2$ through the shoulder $a'$, so that the surface of this gasket is exposed. This exposed position forms the primary valve seat. The valve disk F is arranged in the valve body. It has the forwardly projecting primary seat $f$ which is adapted to operate upon the gasket or seat E. It has the auxiliary seat $f'$ which seats on the shoulder $a'$ when the extension B is removed, thus permitting the removal of the extension B without any other cut off than this valve. A shoulder $f^4$ extends outwardly from the auxiliary seat and this shoulder has the notches $f^2$ in the passage by the valve. A cylindrical extension $f^3$ protrudes from the rear of the valve disk and this cylindrical extension is provided with the radial openings $f^5$ through which liquid passes. This deflecting of the water largely prevents the water hammer. At the rear of the cylinder is arranged a shoulder $f^6$ which forms a closure with the valve body, forcing the liquid to pass through the radial openings $f^5$.

A standard screw extension G is arranged on the end of the valve body. It is provided with the screw $g$ which is adapted to fit the ordinary pipe coupling. It also, in connection with the valve body, forms a cage in the valve. A push pin H communicates the action of the arm $d^2$ to the valve. It is preferably provided with the spirally arranged flutes $h$. A finger $b^3$ is arranged in the body B with a buffer end $b^4$ in the path of the arm $d^2$ and limits its return movement. It is preferably provided with a cushion of rubber or other suitable material, the principal purpose of this being to make the operation of the valve noiseless.

In the operation of the valve the handle is moved. This swings the arm $d^2$ against the push pin H and opens the valve. One of the purposes for arranging the valve stem at one side of the axis of the valve is to get sufficient swing of the arm $d^2$ to operate the valve without moving it to alinement with the axis. In the construction shown, the valve is under all circumstances closed inasmuch as the arm cannot be swung in such a position that it tends to lock a return movement.

What I claim as new is:

1. In a faucet the combination of a body extension; a stem body having its axis offset from the body extension said stem body being connected with said extension; a valve operating stem arranged in said stem body; an arm arranged on said stem and extending into the axis of the body extension; a valve body to which the extension is removably attached, having an auxiliary valve seat therein; a main valve seat exposed by the removal of the extension; and a valve disk arranged to act on the main valve seat and having an auxiliary seating surface arranged to act on the auxiliary seat when the extension is removed said main valve seat and auxiliary seat being faced in the same direction.

2. In a faucet the combination of the body extension; the valve operating stem arranged in said extension; a valve body to which the extension is removably attached having an auxiliary valve seat therein; a main valve seat exposed by the removal of the extension said main valve seat and auxiliary seat being faced in the same direction; a valve disk having a primary and auxiliary valve surface; a cylindrical extension on said disk projecting toward the inlet of the valve and having a centrally located opening forming an annular wall and a series of radial openings through said annular wall.

3. In a faucet the combination of the body extension; the valve operating stem arranged in said extension; a valve body to which the extension is removably attached having an auxiliary valve seat therein; a main valve seat exposed by the removal of the extension said main valve seat and auxiliary valve seat being faced in the same direction; a valve disk having a primary and auxiliary valve surface; and a cylindrical extension on said disk projecting toward the inlet of the valve and having a centrally located opening forming an annular wall and a series of radial openings through said annular wall, said disk having a notched shoulder by which the liquid is passed.

4. In a faucet the combination of a valve body having a valve seat thereon; means for actuating the valve to force it from its seat; a valve disk for operating upon said seat, said disk having a notched shoulder and cylindrical extension projecting toward the inlet of the valve, said extension having a central opening forming an annular wall having radial openings for the passage of the fluid passing the valve; and a shoulder on said extension nearer the inlet than said radial openings and forming a closure with the valve body.

5. In a faucet the combination of a valve body having a valve seat thereon; means for actuating the valve to force it from its seat; a valve disk for operating upon said seat, said disk having a cylindrical extension projected toward the inlet of the valve and having a central opening forming an annular wall, said annular wall having radial openings through it; and a shoulder on said extension nearer the inlet than the radial openings and forming a closure with the valve body.

6. In a faucet the combination of the body extension, B; the valve body having the valve shoulder $a'$ thereon; the gasket E between the valve body and the extension, said gasket forming the primary seat; the disk F having the protruding seating surface $f$ adapted to seat on the gasket; a seated surface $f'$ adapted to seat on the surface $a'$; the notched shoulder $f^4$; the annular extension $f^3$ having the radial opening $f'$ therein; and the closure shoulder $f^6$ on said extension.

7. In a faucet the combination of the body extension; a valve body, one of said parts having a shoulder and the other being screw threaded; a flange nut for uniting the extension and body, acting with said shoulder; a stem on the body extension for operating the valve; a gasket between the valve body and the extension, clamped in place by said flange nut, said gasket forming a primary seat in the valve; and a valve disk arranged to seat on the gasket and on the valve body, forming a closure with the valve body when the extension is removed.

8. In a faucet the combination of the extension B having the screw threaded end and protruding shoulder $b'$; the valve body A mounted on said shoulder and having a shoulder $a$ and the seat shoulder $a'$; the flange nut A' for uniting the extension on the body; the gasket E clamped in place by the flange nut and forming a primary seat said primary seat, and the seat on the shoulder $a'$ being faced in the same direction; and a valve disk in the valve body adapted to seat on the gasket and on the valve body.

In testimony whereof I have hereunto set my hand in the presence of two subscribing witnesses.

WILLIAM B. M. BASHLIN.

Witnesses:
C. D. HIGBY,
M. E. MOHL.